US012467813B2

(12) United States Patent
Sweeney et al.

(10) Patent No.: US 12,467,813 B2
(45) Date of Patent: Nov. 11, 2025

(54) SYSTEM AND METHOD FOR MONITORING FABRY-PÉROT CAVITY DISPLACEMENTS

(71) Applicant: UT-Battelle, LLC, Oak Ridge, TN (US)

(72) Inventors: Daniel C. Sweeney, Oak Ridge, TN (US); Anthony Birri, Oak Ridge, TN (US); Christian M. Petrie, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 380 days.

(21) Appl. No.: 18/219,746

(22) Filed: Jul. 10, 2023

(65) Prior Publication Data
US 2024/0011859 A1 Jan. 11, 2024

Related U.S. Application Data

(60) Provisional application No. 63/388,156, filed on Jul. 11, 2022.

(51) Int. Cl.
*G01L 9/00* (2006.01)
*G01N 17/00* (2006.01)

(52) U.S. Cl.
CPC ............ *G01L 9/0079* (2013.01); *G01N 17/00* (2013.01)

(58) Field of Classification Search
CPC ......... G01L 9/0079; G01L 1/24; G01L 1/242; G01N 17/00
See application file for complete search history.

(56) References Cited

U.S. PATENT DOCUMENTS

2007/0041019 A1* 2/2007 Schmidt ................. G01L 11/02
356/480

OTHER PUBLICATIONS

Huang, Y., Wei, T., Zhou, Z., Zhang, Y., Chen, G., & Xiao, H. (2010), An extrinsinc Fabry-Perot interferometer-based large strain sensor with high resolution. Measurement science and technology, 21(10), 105308, pp. 1-8.
(Continued)

*Primary Examiner* — Paul M. West
(74) *Attorney, Agent, or Firm* — Warner Norcross + Judd LLP

(57) ABSTRACT

A system and method for monitoring Fabry-Perot cavity ("FPC") displacement implementing a predictor-corrector scheme. The system includes an optical interrogator apparatus and a data processing apparatus. The optical interrogator apparatus interrogates the FPC, obtains a spectral interference pattern and outputs a corresponding signal including data associated with a plurality of peaks. The data processing apparatus processes the output signal to produce a prediction for a peak location based on the data associated with the plurality of peaks, and then uses the prediction to identify as correct one of the plurality of peaks. The data processing apparatus then determines and outputs a plurality of FPC length variations. In one embodiment, the data processing system implements a period tracking algorithm to produce the prediction based on the data associated with the plurality of peaks, and uses a phase tracking algorithm to determine an FPC length variation using the identified peak.

20 Claims, 3 Drawing Sheets
(3 of 3 Drawing Sheet(s) Filed in Color)

(56) References Cited

OTHER PUBLICATIONS

Zhang, Baolin, Xinglin Tong, Pan Hu, Qian Guo, Zhiyuan Zheng, and Chaoran Zhou, 2016, "Wavelet Phase Extracting Demodulation Algorithm Based on Scale Factor for Optical Fiber Fabry-Perot Sensing", Optics Express 24 (26), Optica Publishing Group: 29506-11.
Sweeney, Daniel C, Adrian M Schrell, Yun Liu, and Christian M Petrie. 2020. "Metal-Embedded Fiber Optic Sensor Packaging and Signal Demodulation Scheme Towards High-Frequency Dynamic Measurements in Harsh Environments", Sensors and Actuators A: Physical 312, Elsevier: 112075, pp. 1-12.
Sweeney, Daniel, Adrian Schrell, and Christian Petrie, 2021, "The Transient Thermal Response of a Pressure-Driven Fabry-Pérot Cavity", in 12th Nuclear Plant Instrumentation, Control and Human-Machine Interface Technologies (Npic&HMIT), American Nuclear Society.

\* cited by examiner

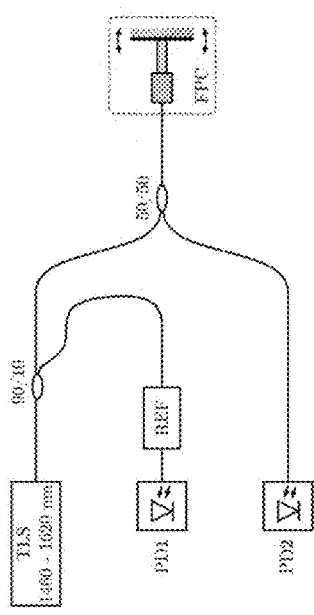
Fig. 3
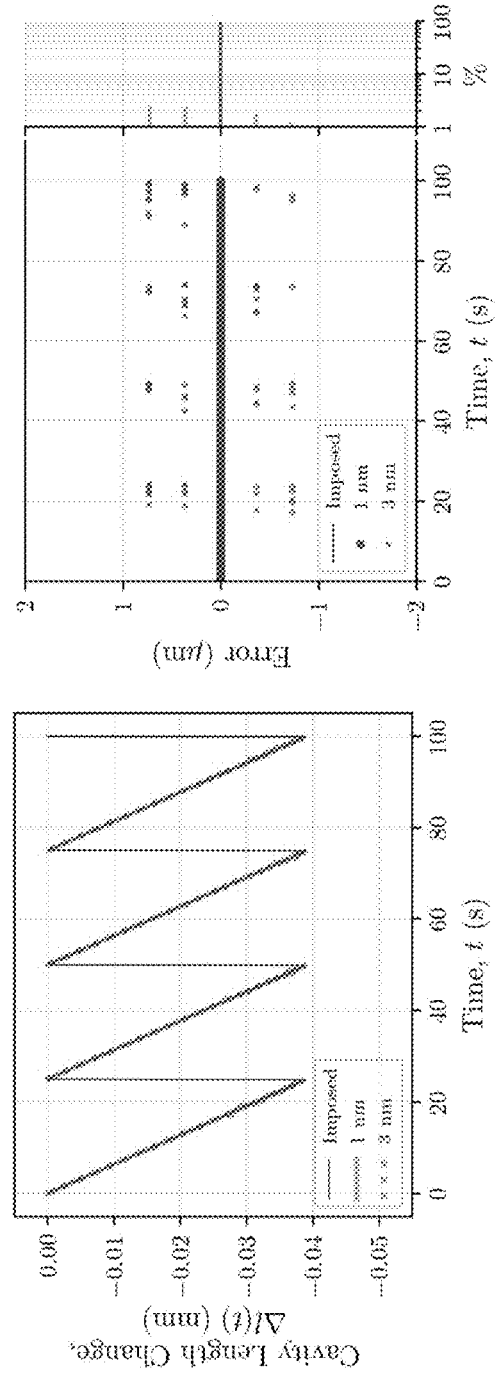
Fig. 4A
Fig. 4B

SYSTEM AND METHOD FOR MONITORING FABRY-PÉROT CAVITY DISPLACEMENTS

STATEMENT REGARDING FEDERALLY SPONSORED RESEARCH

This invention was made with government support under Contract No. DE-AC05-00OR22725 awarded by the U.S. Department of Energy. The government has certain rights in the invention.

FIELD OF THE INVENTION

The present invention relates to optical fiber-based sensors and, more particularly, to systems and methods for monitoring Fabry-Perot cavity displacement.

BACKGROUND OF THE INVENTION

1. Introduction

Optical fiber-based sensors are routinely used for extremely high-precision measurements of various parameters, including length, displacement, and various engineering process parameters that can be derived from changes in length, such as temperature, pressure, fluid flow rate, liquid level, and vibration. Their immunity to electromagnetic interference, small footprint, remote interrogation, and ability to survive harsh environmental conditions also make them candidates for process monitoring in industrial applications, such as chemical processing or energy production applications. For example, fused silica and single-crystal sapphire optical fibers transmit light at temperatures approaching 1,000 and 1,400° C., respectively. Their ability to survive relatively high doses of neutron and gamma radiation also makes them attractive candidates for nuclear reactor applications.

Recent work has focused on leveraging the high-precision displacement monitoring capabilities of fiber-optic sensors to develop a sensor to measure corrosion in nuclear reactors and in experiments performed in research reactors. The sensor is fabricated using ultrasonic additive manufacturing ("UAM") to directly embed an optical fiber within a metal matrix. The surrounding metal fixes the terminal end of the fiber within a metal housing. The metal housing terminates with a thin metal diaphragm that deflects when subjected to a differential pressure. In this way, a Fabry-Pérot cavity ("FPC") is established between the terminal end of the embedded optical fiber and at the inner surface of the metal diaphragm. This approach protects the optical fiber from the surrounding corrosive fluid and enables the sensor to be actuated via internal pneumatic pressurization. Corrosion can be monitored by calculating the change in the diaphragm's thickness based on the analytical expression that relates the measured diaphragm displacement to the applied internal pressure. With an appropriate interrogation technique, the same sensor could also measure higher frequency dynamic fluid interactions such as flow-induced turbulence or vibration.

The ability to accurately resolve micrometer-scale changes in thickness requires measuring diaphragm displacements on the order of micrometers to tens of micrometers with an accuracy on the order of tens of nanometers. Prior works have applied spectral transforms, e.g., fast Fourier transforms and cepstral analyses, up-sampling, and curve fitting to the measured interference spectra to achieve nanometer-scale precision. These spectral techniques come at the cost of increased processing complexity. Wavelet transform-based techniques have also been utilized to demodulate change in FPC length. For example, a Fourier transform was used to generate a plausible range of FPC deflections, which was searched using wavelet transforms to identify the FPC deflection with greater precision. Similar to other spectral transforms, the complexity of the wavelet transform analysis makes it challenging to implement and quickly process data, particularly for high frequency applications.

More recently, a custom-designed low-coherence interferometer ("LCI") was developed and used a novel phase-demodulation scheme to resolve changes in FPC length. Although this system achieved the required resolution, the range of displacements that could be measured were limited to ±~15 µm based on the coherence length of the light source. Moreover, because this system measured total displacement by tracking the cumulative sum of incremental changes in FPC length, e.g., phase tracking, it was susceptible to errors that could be introduced during rapid changes in the FPC length caused by changes in temperature or differential pressure, which could propagate through future measurements. LCI systems can also suffer from signal attenuation, even with compensation techniques.

This motivated interest in developing a method for monitoring larger FPC length changes with a higher dynamic range, e.g., systems that use tunable lasers, and a resolution on the order of tens of nanometers or better. Such a method would have a much broader applicability to any FPC-based sensor that would benefit from the high precision of phase tracking methods over a wider measurement range. Optical coherence tomography techniques have been developed using spectral multiplexing and phase gradients to introduce secondary features into the interference pattern to extend the dynamic range of the measurements while maintaining the precision of phase tracking. Other interrogation methods have achieved similar results with free-space optics by using the optical frequency comb of a femtosecond laser pulse and a pseudo-dithering scheme based on laser feedback. Because the ultimate application for the present work is for sensors deployed in harsh environments, free-space optics would be challenging to implement. Therefore, the technologies described below focus on optical fiber-guided signals.

2. Conventional Methods

An FPC is an optical resonator that includes two parallel reflective surfaces separated by a medium with group index $n_g$ and cavity length l. Light that is incident on the first surface—usually launched via an optical fiber—is partially reflected. The transmitted portion of the light passes through the medium and is reflected at the second surface before it recombines with the light that was reflected from the first surface to generate an interference pattern. The intensity of the reflected interference pattern (reflectance, $I_R$) generated by an ideal lossless FPC is given by $$I_R(\lambda) = \left( \frac{(\sqrt{R_1} - \sqrt{R_2})^2 + 4\sqrt{R_1 R_2} \sin^2(\phi/2)}{(1 - \sqrt{R_1 R_2})^2 + 4\sqrt{R_1 R_2} \sin^2(\phi/2)} \right) I_0, \quad (1)$$

where $R_1$ and $R_2$ are the reflectivities of the first and second reflections, respectively; $I_0$ is the incident light intensity; $\phi = 4\pi n_g l/\lambda$ is the phase difference between the two reflected beams; and $\lambda$ is the wavelength of the incident light. This expression is consistent with previous derivations when $R_1 \neq R_2$ and $R_1 = R_2$. Interrogating an FPC with a broadband light source produces a periodic spectral interference pattern. The free spectral range can be calculated based on the peaks or valleys in $I_R$. Only the term peaks will be used herein. For consecutive interference peaks m and m−1 with wavelengths $[\lambda]_m$ and $[\lambda]_{m-1}$, the free spectral range (FSR) is equal to $[\Delta\lambda_{fsr}]_m = [\lambda]_m - [\lambda]_{m-1}$. Assuming a normal incidence, the FSR is related to l at time t according to Eq. 2:

$$[\Delta\lambda_{fsr}]_m(t) = \frac{[\lambda]_m(t)^2}{2n_g l(t) + [\lambda]_m(t)}. \quad (2)$$

Based on peak m, the cavity length can be calculated per Eq. 3.

$$l_m(t) = \frac{[\lambda]_m(t)([\lambda]_m(t) - [\Delta\lambda_{fsr}]_m(t))}{2n_g[\Delta\lambda_{fsr}]_m(t)}. \quad (3)$$

The true time-dependent cavity length l(t) can be determined by using various statistical methods, and one such one method is described in more detail in the Section titled Approach.

The method for determining the cavity length is called period tracking. The main advantage of period tracking techniques is that they offer an absolute measurement of the cavity length. Period tracking methods can also use a high-intensity tunable laser source ("TLS") to provide a high signal-to-noise ratio. The disadvantage of period tracking techniques is their relatively low displacement resolution.

Relative displacements can also be measured from the same spectral interference pattern using phase tracking methods. With phase tracking methods, one or multiple peak wavelengths in the interference pattern are tracked over time, and the relative change in cavity length is proportional to the relative change in the peak wavelengths. Equation (4) describes the relationship between the relative change in cavity length, $\Delta l_m(t) = l_m(t) - l_m(t_0)$, and the change in wavelength, $[\Delta\lambda]_m$, for peak m relative to the initial wavelength at time to:

$$\frac{\Delta l_m(t)}{l_m(t_0)} = \frac{[\Delta\lambda]_m(t)}{[\lambda]_m(t_0)}. \quad (4)$$

Because phase tracking methods depend only on the change in one peak, they can resolve much smaller displacements—nanometer resolution is possible—but the maximum resolvable change in cavity length is limited because of phase ambiguities. Per the definition of φ, the maximum resolvable change in cavity length for an air cavity, e.g., for $n_g=1$, is equal to λ/2, or less than 1 µm for typical wavelengths on the order of 1,550 nm. This range limitation can be overcome by performing a cumulative sum of incremental phase shifts, but aliasing errors can still occur if the incremental phase shift exceeds π.

SUMMARY OF THE INVENTION

The present invention provides a system and method for monitoring Fabry-Perot cavity ("FPC") displacement that implements a hybrid or predictor-corrector scheme. The system includes an optical interrogator apparatus and a data processing apparatus communicatively coupled with the optical interrogator apparatus. The optical interrogator apparatus interrogates the FPC, obtains a spectral interference pattern and outputs to the data processing apparatus a corresponding signal including data associated with a plurality of peaks. The data processing apparatus processes the signal to produce predictions for the peak locations, and then uses the predictions to identify the correct ones of the plurality of peaks. The data processing apparatus then uses the identified correct peaks to determine a plurality of FPC length variations, and outputs a FPC length variation as a function of the determined plurality of FPC length variations. In one embodiment, the data processing system implements a period tracking algorithm to produce the prediction based on the data associated with the plurality of peaks, and then uses a phase tracking algorithm to determine an FPC length variation using the identified peak.

In one embodiment, the optical interrogator apparatus is configured to: (a) interrogate the FPC with light, (b) produce a periodic spectral interference pattern from the light that interrogated the FPC, wherein the periodic spectral interference pattern spans over an operational spectral range {λ_min, λ_max}, and wherein locations of peaks of the periodic spectral interference pattern vary in time in accordance with the variations of the FPC length, and (c) output a signal of the peak locations.

In one embodiment, the data processing apparatus is (as noted above) communicatively coupled with the optical interrogator apparatus and is configured to (a) receive, from the optical interrogator apparatus, the signal of the peak locations, (b) determine a reference length of the FPC as an average of FPC lengths corresponding to a reference instance of the signal of the peak locations, (c) for each instance of the signal of the peak locations following the reference instance: (i) determine a current length of the FPC as an average of FPC lengths corresponding to a current instance of the signal of the peak locations, (ii) predict peak locations corresponding to the current instance of the signal of the peak locations based on the current length, the reference length, and the reference instance of the signal of the peak locations, (iii) identify as corrected peak locations the corresponding ones from among the peak locations of the current instance of the signal within the operational spectral range that are nearest to the predicted peak locations, (iv) estimate a current FPC length variation as a median of FPC length variations corresponding to the corrected peak locations, the reference instance of the signal of the peak locations, and the reference length, and (v) determine the current FPC length variation as a median of previously estimated FPC length variations over a moving time window of predetermined duration, and (d) output a signal of the determined FPC length variations.

In one embodiment, the sampling frequency of the signal of the peak locations is about 1 kHz.

In one embodiment, the predetermined duration of the moving time window is in the range of 10-50 samples.

In one embodiment, the average used by the data processing apparatus to determine a particular length of the FPC comprises a truncated average of the FPC lengths corresponding to the particular instance of the signal of the peak locations.

In one embodiment, the maximum variation of the FPC length Δl(t) corresponds to $$\frac{\lambda_{max} - \lambda_{min}}{\lambda_C} l(t_0), \text{ where } (\lambda_{max} - \lambda_{min})$$

is the operational range, and $\lambda_C$ is the central wavelength of the light used to interrogate the FPC.

In one embodiment, the data processing apparatus is configured to reset the determined reference length of the FPC from $l(t_0)$ to a larger value $l(t>t_0)>l(t_0)$ to enhance the system's dynamic range for measuring variations of the FPC length.

In one embodiment, the data processing apparatus is implemented as one of a microprocessor, an FPGA, or an ASIC.

In one embodiment, the data processing apparatus is implemented as a software module to be integrated in a software system configured to control the optical interrogator apparatus.

In one embodiment, the present invention is incorporated into a sensor for measuring corrosion in nuclear reactors. The corrosion sensor may include an optical interrogator apparatus and a data processing apparatus communicatively coupled with the optical interrogator apparatus. The corrosion sensor may further include an FPC.

In one embodiment, the present invention is incorporated into a sensor for measuring pressure. The pressure sensor may include an optical interrogator apparatus and a data processing apparatus communicatively coupled with the optical interrogator apparatus. The pressure sensor may further include an FPC.

The change in length of an optical fiber-based FPC can be precisely measured using phase tracking, but the displacement range is limited by phase ambiguity. Period tracking techniques determine the absolute FPC length, but with larger uncertainties from tracking the spacing between multiple peaks. The present invention provides a hybrid system and method that identifies appropriate peaks for phase tracking using a coarse estimate obtained from the free spectral range to effectively maintain the high precision (~1 nm) of phase tracking techniques to measure ~24 µm displacements, well beyond the range limitations (typically <1 µm) of phase tracking methods.

These and other features of the invention will be more fully understood and appreciated by reference to the description of the embodiments and the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is a schematic representation showing an optical network suitable for use in an embodiment of the present invention.

FIG. 4A is a graph showing imposed simulated FPC length changes over time.

FIG. 4B is a graph showing the results of the simulation shown in FIG. 4A.

Figures 1A, 1B:
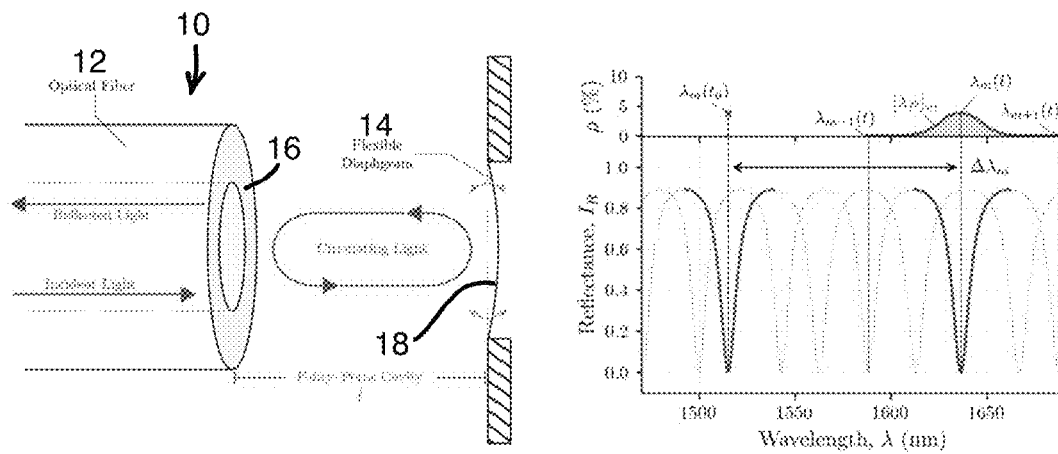
FIG. 1A is a schematic representation of a Fabry-Perot cavity.
FIG. 1B is a graph showing an exemplary interference pattern.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF CURRENT EMBODIMENTS

The present invention provides a system and method implementing a hybrid or predictor-corrector scheme to realize the high precision of phase tracking techniques while also measuring absolute deflections greater than the limitations imposed by the phase ambiguity of the free spectral range ("FSR").

FIG. 1A is a schematic representation of an exemplary Fabry-Perot cavity ("FPC") suitable for use in association with the present invention. In this embodiment, the FPC 10 generally includes an optical fiber 12 spaced apart from a flexible diaphragm 14. The optical fiber 12 delivers light from the light source to the cavity and returns light from the cavity to one or more light sensors (not shown in FIG. 1A). In this embodiment, light reflects from the inside surface 16 of the end of the fiber optic 12 and from the surface 18 of the flexible diaphragm 14. The FPC cavity is generally conventional and will not be described in further detail. The FPC 10 of FIG. 1A is merely exemplary and the present invention is suitable for use with a wide range of FPC designs and is not limited to the FPC shown schematically in FIG. 1A.

FIG. 1B is a graph representing the interference patterns showing the reflected intensity $I_R$ from an idealized FPC and the peaks shifting from blue to red as the cavity length changes. The true wavelength shift $\Delta\lambda_m$ is shown, along with the coarse estimate $\lambda_p$. The upper plot shows the probability density p for the predicted wavelength $\lambda_p$ determined using period tracking in accordance with an embodiment of the present invention. In this embodiment of the present invention, the peak nearest $\lambda_p$ is then identified as $\lambda_C$.

Figure 2:
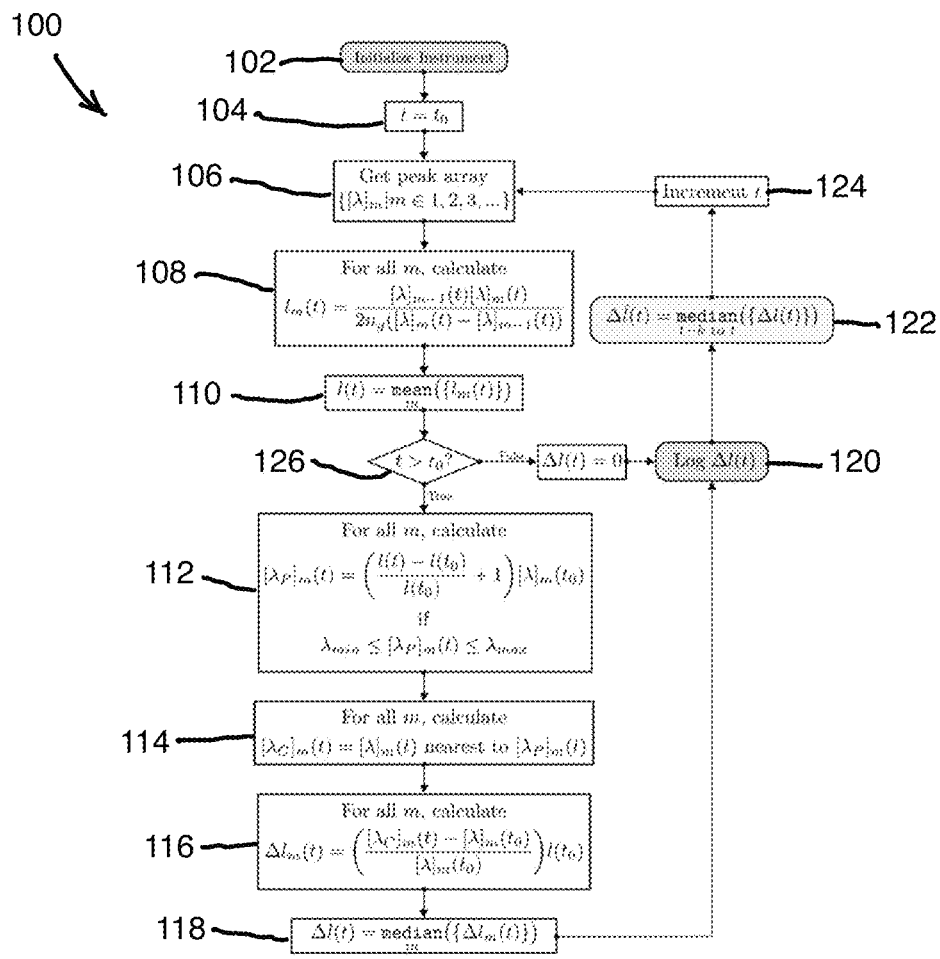
FIG. 2 is a flow chart showing a method in accordance with an embodiment of the present invention.

FIG. 2 is a flowchart showing the general steps implemented in one embodiment of the disclosed hybrid phase-period demodulation scheme. As described in more detail below, the scheme 100 includes the steps of initializing the instrument 102 (e.g. the light source and the light sensor(s)); initializing t to $t_0$ 104; getting a peak array 106 via one or more light sensors; for each peak in the peak array, calculating the length l for that peak 108; determine the current length 110 as the average of FPC lengths corresponding to a current instance of the signal of the peak locations; for each peak in the peak array, predict the peak location 112 corresponding to the current instance of the signal of the peak locations based on the current length, the reference length and the reference instance of the signal of the peak locations; for each peak in the peak array, identify as corrected peak locations 114 the corresponding one from among the peak locations of the current instance of the signal within the operational spectral range that are nearest to the predicted peak locations; for each peak in the peak array, estimate a current FPC length variation 118 as a function of the corrected peak locations, the reference instance of the signal of the peak locations, and the reference length; determine a current FPC length variation 120 as a median of FPC length variations for each peak in the peak array; storing the estimated current FPC length variation 120; determining the current FPC length variation 122 as a median of the previously estimated FPC length variations over a moving time window of predetermined duration, where k is the size of the sample window used for the temporal median filter; incrementing t at block 124; and repeating the process for the next instance in time. In this flowchart, decision block 126 sets the length variation for the initial reference instance to 0 and bypasses the length-variation calculating steps in the flowchart.

First, Eq. 3 is used to provide a coarse measurement of the initial cavity length, $l_m(t_0)$, and peak locations $[\lambda]_m(t_0)$. In the illustrated embodiment, a mean operation, optionally including a removal of the upper and lower 25% of the length estimates $l_m(t_0)$ to mitigate the effect of outliers, is used to determine $l(t_0)$ from $l_m(t_0)$. This process is then repeated for all times t to determine the time-dependent cavity lengths $l(t)$. The predicted peak wavelengths $([\lambda_p]_m(t))$ for t>0 are calculated using the change in l and the initial peak locations $([\lambda]_m(t_0))$ as $$[\lambda_P]_m(t) = \left(\frac{l(t) - l(t_0)}{l(t_0)} + 1\right)[\lambda]_m(t_0). \quad (5)$$

From this coarse estimate, the corrected peak locations $([\lambda_C]_m(t))$ are identified by searching for the closest peaks to $[\lambda_p]_m(t)$. The corrected peak locations are then used to precisely determine the change in cavity length $\Delta l_m(t)$ (Eq. 6), or $\Delta l(t)$ after taking the median over all m for which $\lambda_{min} < [\lambda_P]_m < \lambda_{max}$:

$$\Delta l_m(t) = \left(\frac{[\lambda_C]_m(t) - [\lambda]_m(t_0)}{[\lambda]_m(t_0)}\right) l(t_0). \quad (6)$$

By defining $[\lambda_C]_m(t)$ as the peak $[\lambda]_m(t_0)$ nearest to $[\lambda_p]_m(t)$, the predicted peak can move closer to a peak that is higher or lower than the true peak. When this occurs, $[\lambda_C]_m(t)$ will differ from $[\lambda]_m(t)$ by $[\Delta\lambda_{fsr}]_m$. A median filter ensures that these extrema do not significantly affect the determination of $\Delta l(t)$. Finally, a median filter can be applied in the time domain over a fixed-length sample window. This operation further reduces the effects of misidentifying the true peak, but it also could filter out shorter transient displacements.

Hardware and Data Acquisition

A predictor-corrector scheme or hybrid method in accordance with an embodiment of the present invention was evaluated using a sensor that was described previously for measuring the external pressure or corrosion of a thin metal diaphragm. The FPC was formed by first by using ultrasonic additive manufacturing ("UAM") to embed an optical fiber in a nickel-200 block, which was then welded within a cylindrical nickel-200 housing. The housing was terminated with a mirror-polished thin diaphragm with the fiber terminus separated from the diaphragm's surface by 404±5 µm (measured using period tracking). Even after polishing, a thin film could remain on the inner surface of the diaphragm, which could lead to the creation of a dual-cavity FPC, as described in literature. However, no such artifacts were observed during previous testing of similar sensors. Diaphragm deflections were initiated either by manually depressing the outer surface of the diaphragm or via internal pneumatic pressurization of the sensor. The FPC was interrogated using a Hyperion si155 optical sensing instrument designed and fabricated by Luna Innovations Inc., Blacksburg, Virginia, USA. The sensing instrument contains a tunable laser source ("TLS") with a wavelength range of 1,460 to 1,620 nm, as shown in FIG. 3.

A photodetector PD1 records light launched by the TLS, which passes through a reference fiber located on the lower-amplitude arm of a 90/10 coupler. The other arm guides the light from the TLS into the FPC through a 50/50 coupler. The reflected light from the FPC passes through the other input arm of the 50/50 coupler and is recorded by a second photodetector PD2. The optical spectra recorded by PD1 and PD2 are combined to produce the interference pattern resulting from light reflected from the FPC. The optical interrogator includes a peak-finding algorithm that returns the peak locations at a sampling rate of 1 kHz. These peaks were first analyzed using phase tracking, period tracking, and hybrid algorithms implemented in Python 3.8.11. These same algorithms were later integrated into the data acquisition software in LabVIEW 2019 (version 19.0f2; National Instruments, Austin, Texas, USA).

Results

A. Simulated Deflections

Although the disclosed demodulation scheme is not subject to phase ambiguity like phase tracking techniques, it is limited by the range of the TLS. Rearranging Eq. 4 such that $[\lambda]_m(t)$ spans the TLS range $[\lambda_{min}, \lambda_{max}]$, the FPC length at time t, relative to the initial length, is bounded by $$\frac{\lambda_{min}}{\lambda_{max}} < \frac{l(t)}{l(t_0)} < \frac{\lambda_{max}}{\lambda_{min}}. \quad (7)$$

These bounds consider the FPC length changes required to shift a peak across the wavelength range of the TLS: from $\lambda_{min}$ to $\lambda_{max}$ or from $\lambda_{max}$ to $\lambda_{min}$. Using a 0.4 mm FPC length and a TLS wavelength range of 160 nm centered at 1,540 nm, the maximum detectable FPC deflection is approximately ±0.04 mm (10%). Beyond these limits, the peak wavelength shifts outside of the TLS range.

To characterize the theoretical performance of the disclosed hybrid demodulation scheme, FPC length changes were simulated over 99% of the allowable deflection range, and the simulation results are illustrated in FIGS. 4A and 4B.

FIG. 4A shows the imposed FPC deflections used to generate the simulated interference patterns and the FPC deflections that were determined using the hybrid scheme with the addition of random errors in the peak identification, e.g., wavelength domain. These random errors are meant to simulate the effects of false peak identification resulting from the coarse estimate obtained from period tracking. As the cavity length was varied vs. time, as show in FIG. 4A, the added error was randomly sampled across a uniform distribution between ±1 nm, e.g., <[$\Delta\lambda_{fsr}$]/2 ≈1.5 nm per Eq. 2, and ±3 nm, e.g., >[$\Delta\lambda_{fsr}$]/2. FIG. 4B shows the error between the imposed vs. demodulated changes in the FPC length as a function of time, on the left side, and as a histogram with 40 nm bins, on the right side. The apparent discrete nature of the error distribution results from false peak identification during the coarse estimate, e.g., predictor step in the algorithm, which is evident when the peak wavelength error exceeds [$\Delta\lambda_{fsr}$]/2. This phenomenon is discussed in more detail in the below section entitled Propagation of Uncertainty.

B. Repeated Large Negative Deflections

Figure 5:
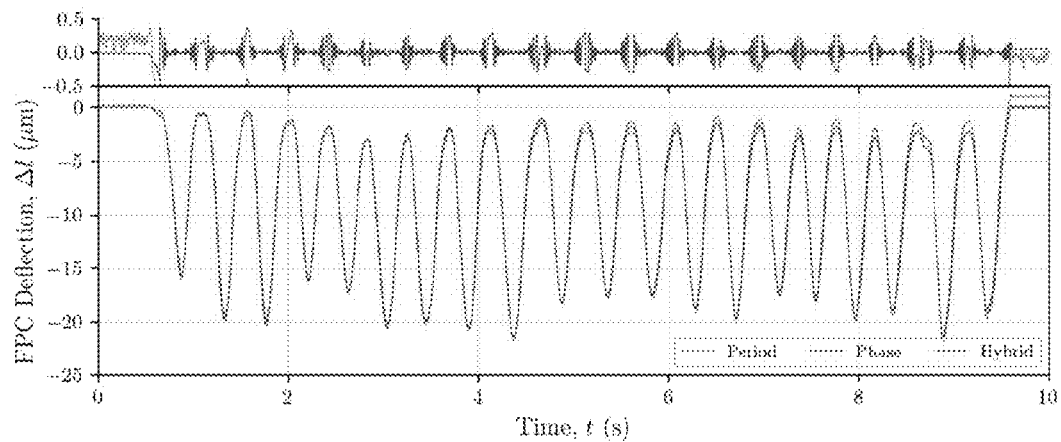
FIG. 5 is a graph comparing measurements of FPC deflections demodulated using period tracking, phase tracking and an embodiment of the present invention.

To further describe the hybrid technique of one embodiment of the present invention and compare the measured displacements with those obtained using conventional period and phase tracking techniques, the diaphragm was repeatedly manually depressed to produce deflections on the order of 15-20 μm, as shown in FIG. 5.

FIG. 5 shows experimental measurements of FPC deflections demodulated using period tracking (gray), phase tracking (red), and the disclosed hybrid technique (blue) as the diaphragm was manually depressed many times over the course of 10 s. The upper plot shows the phase tracking data with the initial phase measurement used as a reference without performing the cumulative summation. This illustrates how phase tracking is unsuitable for tracking such large FPC deflections. The cumulative phase tracking method is shown in the lower plot to illustrate how cumulative sums of incremental displacements determined using phase tracking can lead to error propagation.

C. Stepwise Positive Deflections

More controlled diaphragm deflections were initiated by pneumatically pressurizing the interior of the sensor. A stepwise pressure profile was used to internally pressurize the system. An independent pressure transducer was used to record the internal pressure simultaneously with the FPC displacements. Both sets of measurements were recorded at a rate of 1 kHz as the pressure set point was increased from 100 to 150 kPa in steps of 12.5 kPa, each lasting 30 s, as shown in FIG. 6. The pressure measurements (gray, right axis) are plotted along with the deflection measurements (left axis) determined using the unfiltered hybrid (transparent blue) and period tracking (transparent red) methods, as well as the filtered hybrid (opaque blue) and period tracking (opaque red) methods. Histograms with a bin size of 20 nm were generated from the steady-state measurements comprising the last ~3 s of each ~30 s hold period and were compared for the (b) unfiltered and (c) filtered hybrid and period tracking methods. The histogram data are represented as the percent of total counts in each bin. The error is defined as the difference between the demodulated FPC length change and the value obtained using the mean of the unfiltered hybrid data at each pressure set point.

Figure 6A:
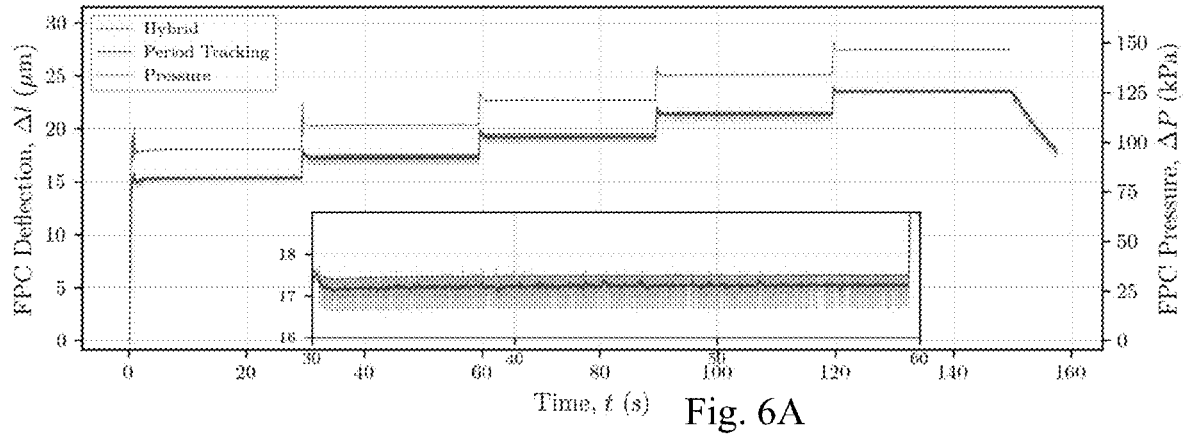
FIG. 6A is a graph showing simulated FPC length changes produced by pneumatic pressurization.
Figure 6B:
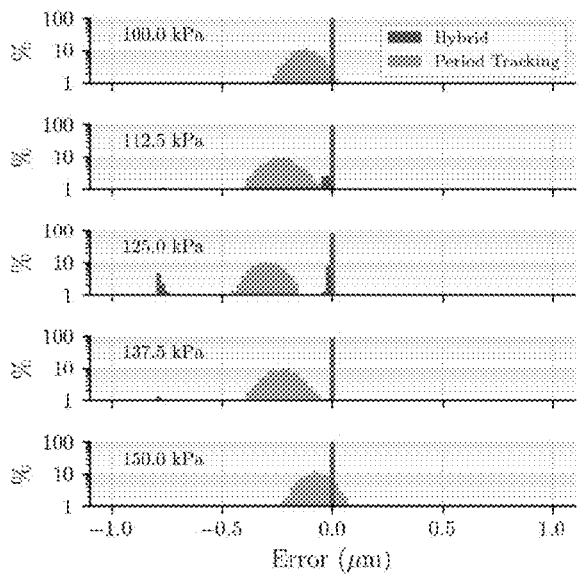
FIG. 6B is a graph showing unfiltered results obtained from the simulation shown in FIG. 6A.

These data were analyzed with and without using median time-domain filtering with a 25-sample window, e.g., affecting k in box 122 in FIG. 2. FIG. 6(a) shows that both the period tracking, and hybrid demodulation methods produce deflections that closely follow the increasing pressure steps at steady state, which was the last ~3 s of each hold-step before the PID set point was changed. To characterize the variation of the data around each steady-state point, distributions were created for all data, both hybrid and period tracking methods, within each ~3 s steady-state window after subtracting the corresponding median deflection obtained using the unfiltered hybrid data at each pressure set point. For both the hybrid and period tracking techniques, results are shown with and without a time-domain median filter with a 25-sample window. Without time-domain median filtering, the period tracking method yields a similar steady-state standard deviation of ±0.07 to 0.09 μm, whereas the hybrid method produces a standard deviation of ±0.002 to 0.2 μm, as shown in FIG. 6B, and Table 1. Table 1 shows steady-state internal FPC pressures and deflections measured using the period tracking and hybrid methods during the last 3 s of each 30 s constant-pressure period. Data shown as mean(median)±standard deviation.

TABLE 1

| Method | Pressure (kPa) | Unfiltered deflection (μm) | Filtered deflection (μm) |
| --- | --- | --- | --- |
| Period tracking | 96.08 ± 0.05 | 15.33(15.33) ± 0.07 | 15.34(15.33) ± 0.07 |
| | 108.56 ± 0.05 | 17.25(17.24) ± 0.09 | 17.24(17.24) ± 0.03 |
| | 121.35 ± 0.05 | 19.22(19.22) ± 0.07 | 19.22(19.22) ± 0.02 |
| | 133.71 ± 0.05 | 21.32(21.32) ± 0.09 | 21.31(21.32) ± 0.03 |
| | 146.47 ± 0.05 | 23.53(23.53) ± 0.07 | 23.53(23.53) ± 0.02 |
| Hybrid | 96.08 ± 0.05 | 15.5(15.5) ± 0.002 | 15.4512(15.4509) ± 0.0009 |
| | 108.56 ± 0.05 | 17.4(17.5) ± 0.1 | 17.475(17.475) ± 0.001 |
| | 121.35 ± 0.05 | 19.5(19.5) ± 0.2 | 19.518(19.518) ± 0.001 |
| | 133.71 ± 0.05 | 21.5(21.5) ± 0.1 | 21.542(21.542) ± 0.001 |
| | 146.47 ± 0.05 | 23.6(23.6) ± 0.002 | 23.600(23.599) ± 0.002 |

As expected, the period-tracking and hybrid methods were able to resolve deflections beyond the limitations of the phase-tracking method. The displacements determined by using the hybrid method matched those determined by using the period tracking method but with a noticeably higher precision.

Figure 6C:
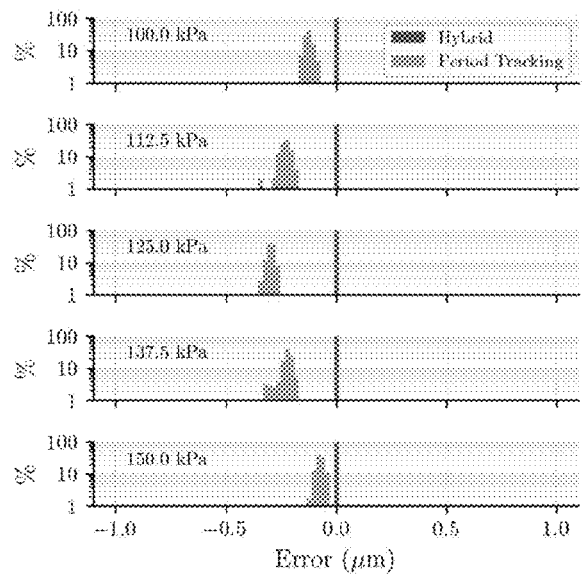
FIG. 6C is a graph showing filtered results obtained from the simulation shown in FIG. 6A.

However, the primary source of error when using the hybrid method originates when $\lambda_C$ is incorrectly identified as a peak to the left or right, e.g., $\lambda_{m-1}$ or $\lambda_{m+1}$ in FIG. 1, resulting in a discrete phase shift error of ±2π, or a discrete error of ±λ/2 in the FPC length. These errors collectively manifest as impulse or salt-and-pepper noise and are visible near Δl−l̄=−0.7 μm≈−λ/2 in FIG. 6B. Therefore, this collection of incorrect peaks inflates the standard deviation associated with deflection measurements made with the hybrid method. Applying median time-domain filters, as shown in FIG. 6C, is a simple way to mitigate these errors. The median operation, rather than the mean, is more appropriate for removing errors that occur when the incorrect peak selection is skewed to one side, as shown in FIG. 6B, especially because the error distribution is discrete and appears in <10% of the measurements. This filter improved the precision of the period tracking measurement by approximately two- to three-fold and had relatively little effect on the steady-state deflection measurements, which are shown in Table 1. However, the same filter applied to deflection measurements produced using the hybrid method resulted in up to a hundred-fold increase in precision because it mitigated the effects of incorrect peak selection.

D. Propagation of Uncertainty

The propagation of uncertainty for each FPC interrogation method was analyzed using a variance formula. The error in $\Delta l$ when using phase tracking ($[\sigma_{phase}]_m$) for peak m is given by $$\frac{[\sigma_{phase}]_m}{l(t_0)} = \frac{\sigma_\lambda}{[\lambda]_m(t_0)}. \tag{8}$$

Relative to the initial FPC length, this error is independent of time and only depends on the wavelength uncertainty $\sigma_\lambda$ relative to the initial peak wavelength $[\lambda]_m(t_0)$. The time-dependent error in $\Delta l$ when using period tracking ($[\sigma_{period}]_m(t)$) is given by $$\frac{[\sigma_{period}]_m(t)}{l(t_0)} = \left(\frac{\sqrt{[\lambda]_m(t)^4 + [\lambda]_{m+1}(t)^4}}{2n_g l(t_0)([\lambda]_m(t) - [\lambda]_{m+1}(t))^2}\right)\sigma_\lambda. \tag{9}$$

If $[\lambda]_{m+1}(t) \approx [\lambda]_m(t)$, the numerator in Eq. 4 is simplified to $([\lambda]_m(t))^2$, which allows equation 9 to be rewritten as $$\frac{[\sigma_{period}]_m(t)}{l(t_0)} \approx \frac{1}{2n_g l(t_0)}\left(\frac{[\lambda]_m(t)}{[\Delta\lambda_{fsr}]_m(t)}\right)^2 \sigma_\lambda. \tag{10}$$

Like phase tracking uncertainties, this uncertainty is proportional to the wavelength resolution, but it is also inversely proportional to the square of $[\Delta\lambda_{fsr}]_m$. This explains why period tracking techniques have poorer uncertainty, particularly for larger cavity lengths, e.g., smaller $[\Delta\lambda_{fsr}]_m$.

The disclosed hybrid method is essentially identical to phase tracking as long as the coarse estimate obtained using period tracking, e.g., Eq. 5, properly identifies the true peak. If $[\lambda_p]_m(t)$ provides a sufficiently good approximation for $[\lambda]_m(t)$, e.g., within $-[\Delta\lambda_{fsr}]_m(t)/2 < [\lambda_C]_m(t) - [\lambda]_m(t) < [\Delta\lambda_{fsr}]_m(t)/2$, then the correct corresponding peak is selected so that $[\lambda_C]_m(t) = [\lambda]_m(t)$. However, if $[\lambda_p]_m(t)$ is outside this window, an incorrect peak will be selected for $[\lambda_C]_m(t)$, which differs from $[\lambda]_m(t)$ by approximately an integer multiple of $[\lambda_{fsr}]_m(t)$ in addition to the small correction required to identify $[\lambda]_m(t)$. Therefore, the error in the hybrid method $[\sigma_{hybrid}]_m$ can be represented as $$[\sigma_{hybrid}]_m = [\sigma_{phase}]_m + k_m l(t_0)\left(\frac{[\Delta\lambda_{fsr}]_m(t)}{[\lambda]_m(t_0)}\right), \tag{11}$$

where $k_m$ is an integer. If more than half of the peaks are properly selected, e.g., $k_m=0$, the median filters that are applied in both the m and t domains could essentially eliminate the contribution due to incorrect peak selection. This would be the case even if the distribution of $k_m$ is not perfectly symmetric about $k_m=0$, as shown in FIGS. 6b-6c. In this hypothetical scenario, as the window length of the time-domain filter increases, the probability of incorrect peak selection decreases and the error in the hybrid method approaches the error for phase tracking. The cost of increasing the time-domain window length is the inability to accurately resolve transient displacements that occur within the filter window.

The data in Table 1 demonstrates that standard deviation of the filtered measurements made using the hybrid method are on the order of 1 nm. If the distribution of $k_m$ is truly symmetric around $k_m=0$ such that $[\sigma_{hybrid}]_m - [\sigma_{phase}]_m \approx 1$ nm, then Eq. 3 can be used with $l(t_0)=404$ μm and $[\lambda]_m(t_0) \approx 1,540$ nm to give $\sigma_\lambda=4$ pm. The manufacturer of the optical interrogator quotes a wavelength accuracy and repeatability of 1 pm, which is a similar order of magnitude. This suggests that the error for the hybrid does indeed approach that of phase tracking.

DISCUSSION

The hybrid method described herein for demodulating FPC lengths from their optical spectra demonstrably improves precision compared with period tracking methods without relying on cumulative sums of incremental phase tracking measurements, which suffer from error propagation and drift. Rather than relying on introducing secondary features into the interference pattern by manipulating the incident light or affecting the optical signal returning to the interferometer, as in previous work, the hybrid method described herein uses the primary interference pattern from the FPC alone via a filtering scheme. This is particularly attractive because it enables the hybrid method to be implemented as a simple drop-in replacement for demodulating data from FPC-based sensors. Although the hybrid method overcomes the challenges associated with conventional peak-tracking algorithms, it is still limited by the wavelength range of the tunable laser used to interrogate the FPC. Ideally, the maximum wavelength shift observable using the hybrid method is equivalent to the tuning range of the TLS, although in practice this is more limited. In the present study, >50 identifiable peaks initially appeared in the interference pattern recorded by the optical interrogation system. As the FPC length changed, many of those initial peaks were shifted outside the range of the TLS. When the number of remaining peaks that fell within the range of the TLS decreased below approximately 10-15, the algorithm failed to reliably demodulate the FPC length. This limitation in the maximum resolvable FPC displacement could be overcome by updating the reference spectrum at intermediate steps like the adaptive methods developed for optical frequency domain reflectometry.

The application of a time-domain median filter to the FPC deflection measurements produced using the hybrid method effectively removes the impulse noise from the measurement but also could introduce a delay and smooths over short-duration physical FPC length changes. The effect of this filtering depends on the size of the sample window. Depending on the desired accuracy and measurement frequencies of interest, the time-domain filtering could be adjusted, as needed. For the original application noted herein, e.g., corrosion monitoring via stepwise, internal static pressurization of an FPC, the frequency limitations imposed by the time-domain filtering would not affect the ability to perform these measurements.

CONCLUSION

Optical fiber based FPCs are popular sensors for measuring fine displacements because of their high precision. Spectral interrogation methods for FPCs are particularly popular because they produce measurements with precision on the order of nanometers using phase tracking methods. However, the maximum resolvable displacements using methods are limited by phase ambiguities. Period tracking methods overcome this limitation and enable the calculation of an absolute FPC length but do not offer the same precision. To overcome the range limitation of phase tracking methods and the relatively poor precision of period tracking methods, a hybrid approach was demonstrated. This method used a period tracking method to predict a coarse wavelength shift, which was then fine-tuned to select the nearest peak in the interference spectrum to determine a much more precise change in the FPC length. Using a median filter to remove impulse noise, this hybrid method was demonstrated to produce consistent measurements with standard deviations on the order of nanometers, a hundred-fold lower than the precision obtained using similarly filtered period tracking methods. Furthermore, this precision is maintained while measuring cavity deflections >20 µm, e.g., >5% of the initial FPC length.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A system for measuring variations in time of a length of a Fabry-Perot cavity (FPC), the system comprising:
   an optical interrogator apparatus configured to
      interrogate the FPC with light,
      produce a periodic spectral interference pattern from the light that interrogated the FPC, wherein the periodic spectral interference pattern spans over an operational spectral range $\{\lambda_{min}, \lambda_{max}\}$, and wherein locations of peaks of the periodic spectral interference pattern vary in time in accordance with the variations of the FPC length, and
      output a signal of the peak locations; and
   a data processing apparatus communicatively coupled with the optical interrogator apparatus and configured to
      receive, from the optical interrogator apparatus, the signal of the peak locations,
      determine a reference length of the FPC as an average of FPC lengths corresponding to a reference instance of the signal of the peak locations,
      for each instance of the signal of the peak locations following the reference instance,
         determine a current length of the FPC as an average of FPC lengths corresponding to a current instance of the signal of the peak locations,
         predict peak locations corresponding to the current instance of the signal of the peak locations based on the current length, the reference length, and the reference instance of the signal of the peak locations,
         identify as corrected peak locations the corresponding ones from among the peak locations of the current instance of the signal within the operational spectral range that are nearest to the predicted peak locations,
         estimate a current FPC length variation as a median of FPC length variations corresponding to the corrected peak locations, the reference instance of the signal of the peak locations, and the reference length, and
         determine the current FPC length variation as a median of previously estimated FPC length variations over a moving time window of predetermined duration, and
      output a signal of the determined FPC length variations.

2. The system of claim 1, wherein a sampling frequency of the signal of the peak locations is about 1 kHz, and
   the predetermined duration of the moving time window is in a range of >10 samples.

3. The system of claim 2, wherein the data processing apparatus is implemented as one of a microprocessor, an FPGA, or an ASIC.

4. The system of claim 2, wherein the data processing apparatus is implemented as a software module to be integrated in a software system configured to control the optical interrogator apparatus.

5. The system of claim 1, wherein the average used by the data processing apparatus to determine a particular length of the FPC comprises a truncated average of the FPC lengths corresponding to the particular instance of the signal of the peak locations.

6. The system of claim 1, wherein
   the maximum variation of the FPC length $\Delta l(t)$ corresponds to $$\frac{\lambda_{max} - \lambda_{min}}{\lambda_C} l(t_0), \text{ where } (\lambda_{max} - \lambda_{min})$$

is the operational range, and $\lambda_C$ is the central wavelength of the light used to interrogate the FPC, and
   the data processing apparatus is configured to reset the determined reference length of the FPC from $l(t_0)$ to a larger value $l(t > t_0) > l(t_0)$ to enhance the system's dynamic range for measuring variations of the FPC length.

7. The system of claim 1 further including the FPC.

8. The system of claim 7, wherein the FPC includes an optical fiber disposed in spaced relation to a flexible diaphragm, the flexible diaphragm configured to change shape in response to variations in at least one of pressure and corrosion, the flexible diaphragm having a reflective surface facing the optical fiber.

9. The system of claim 8 wherein the optical interrogator includes a tunable laser source, a first photodetector, a second photodetector and a plurality of optical fibers operatively joining the tunable laser, the first photodetector and the second photodetector with the FPC.

10. A sensor for measuring corrosion in nuclear reactors, the sensor comprising:
    an FPC; and
    the system of claim 1.

11. A sensor for measuring pressure, the sensor comprising:
    an FPC; and
    the system of claim 1.

12. A system for measuring variations in time of a length of a Fabry-Perot cavity (FPC), the system comprising:
    an optical interrogator apparatus configured to
        interrogate the FPC with light,
        produce a periodic spectral interference pattern from the light that interrogated the FPC, wherein the periodic spectral interference pattern spans over an operational spectral range $\{\lambda_{min}, \lambda_{max}\}$, and wherein locations of peaks of the periodic spectral interference pattern vary in time in accordance with the variations of the FPC length, and
        output a signal of the peak locations; and
    a data processing apparatus communicatively coupled with the optical interrogator apparatus and configured to
        receive, from the optical interrogator apparatus, the signal of the peak locations,
        determine a reference length of the FPC as a function of at least one FPC length corresponding to a reference instance of the signal of the peak locations,
        for each instance of the signal of the peak locations following the reference instance,
            determine a current length of the FPC as a statistical analysis of FPC lengths corresponding to a current instance of the signal of the peak locations,
            predict peak locations corresponding to the current instance of the signal of the peak locations based on the current length, the reference length, and the reference instance of the signal of the peak locations,
            identify as corrected peak locations the corresponding ones from among the peak locations of the current instance of the signal within the operational spectral range that are nearest to the predicted peak locations, and
            estimate a current FPC length variation as a statistical analysis of FPC length variations corresponding to the corrected peak locations, the reference instance of the signal of the peak locations, and the reference length, and
        output a signal of the FPC length variations.

13. The system of claim 12 wherein the statistical analysis used by the data processing apparatus to determine a current length of the FPC is further defined as an average of FPC lengths corresponding to a current instance of the signal of the peak locations.

14. The system of claim 12 wherein the statistical analysis used by the data processing apparatus to estimate a current FPC length variation is further defined as a median of FPC length variations corresponding to the corrected peak locations, the reference instance of the signal of the peak locations, and the reference length.

15. The system of claim 12 wherein the statistical analysis used by the data processing apparatus to determine a current length of the FPC is further defined as an average of FPC lengths corresponding to a current instance of the signal of the peak locations;
    wherein the statistical analysis used by the data processing apparatus to estimate a current FPC length variation is further defined as a median of FPC length variations corresponding to the corrected peak locations, the reference instance of the signal of the peak locations, and the reference length;
    wherein the data processing apparatus is configured to determine the current FPC length variation as a median of previously estimated FPC length variations over a moving time window of predetermined duration; and
    wherein the output signal is further defined as a signal of the determined FPC length variations.

16. The system of claim 12 wherein the optical interrogator includes a tunable laser source, a first photodetector, a second photodetector and a plurality of optical fibers operatively joining the tunable laser, the first photodetector and the second photodetector with the FPC.

17. A method for monitoring Fabry-Perot cavity (FPC) displacement, comprising the steps of:
    interrogating the FPC with light by a light source emitting light over an operational spectral range $\{\lambda_{min}, \lambda_{max}\}$;
    obtaining a spectral interference pattern representative of light returning from the FPC, the returning light being reflected from at least two different reflective surfaces, wherein locations of peaks of the periodic spectral interference pattern vary in time in accordance with the variations of the FPC length;
    producing a signal including data associated with a plurality of peaks in the spectral interference pattern;
    determining a reference length of the FPC as a function of FPC lengths corresponding to a reference instance of the signal of the peak locations
    for each instance of the signal of the peak locations following the reference instance,
        processing the signal using a period tracking algorithm to produce a prediction for a peak location based on the data associated with the plurality of peaks;
        identifying as correct one of the plurality of peaks, the correct peak being selected as one of the plurality of peaks closest to the predicted peak location;
        estimating a plurality of FPC length variations using a phase tracking algorithm;
        determining the current FPC length variation as a median of previously estimated FPC length variations over a moving time window of predetermined duration; and
    output a signal of the determined FPC length variations.

18. The method of claim 17 wherein the step of determining a reference length of the FPC is further defined as determining a reference length of the FPC as an average of FPC lengths corresponding to a reference instance of the signal of the peak locations.

19. The method of claim 18, wherein the maximum variation of the FPC length $\Delta l(t)$ corresponds to $$\frac{\lambda_{max} - \lambda_{min}}{\lambda_C} l(t_0), \text{ where } (\lambda_{max} - \lambda_{min})$$

is the operational range, and $\lambda_C$ is the central wavelength of the light used to interrogate the FPC.

20. The method of claim 18 wherein the step of processing the signal using a period tracking algorithm is further defined as processing the signal using a period tracking algorithm to produce a prediction for a peak location based on the data associated with the plurality of peaks as a function of a current length, a reference length and a reference instance of the signal of the peak locations.

\* \* \* \* \*